United States Patent

Thompson et al.

[11] Patent Number: 6,008,263
[45] Date of Patent: Dec. 28, 1999

[54] MOLDED AND SLAB POLYURETHANE FOAM PREPARED FROM DOUBLE METAL CYANIDE COMPLEX-CATALYZED POLYOXYALKYLENE POLYOLS AND POLYOLS SUITABLE FOR THE PREPARATION THEREOF

[75] Inventors: Andrew M. Thompson, Hurricane, W. Va.; Wolfgang Schmidt, West Chester, Pa.; Donald F. Rohr, Winfield; Jack R. Reese, II, Cross Lanes, both of W. Va.; Mark R. Kinkelaar, Glenmoore, Pa.; Danny J. Frich, Cross Lanes, W. Va.; Thomas P. Farrell, Hockessin; Chiu Yan Chan, Wilmington, both of Del.; Robert W. Beisner, Charleston, W. Va.

[73] Assignee: Lyondell Chemical Worldwide, Inc., Newtown, Pa.

[21] Appl. No.: 09/054,554

[22] Filed: Apr. 3, 1998

[51] Int. Cl.$^6$ .................................................... C08G 18/48
[52] U.S. Cl. ................ 521/174; 252/182.24; 252/182.27; 252/182.29; 521/170; 568/620; 568/624
[58] Field of Search .................. 252/182.24, 182.27, 252/182.29; 521/170, 174; 568/620, 624

[56] References Cited

U.S. PATENT DOCUMENTS 4,472,560  9/1984  Kuyper .
5,100,997  3/1992  Reisch et al. .
5,158,922  10/1992  Hinney et al. .
5,171,759  12/1992  Hager .
5,470,813  11/1995  Le-Khac .
5,482,908  1/1996  Le-Khac .
5,545,601  8/1996  Le-Khac .
5,811,829  9/1998  Lawrey et al. ...................... 252/182.24

FOREIGN PATENT DOCUMENTS

0 677 543 A1  10/1995  European Pat. Off. .
2615927  6/1997  Japan .

Primary Examiner—John M. Cooney, Jr.
Attorney, Agent, or Firm—Brooks & Kushman P.C.

[57] ABSTRACT

Copolymer DMC-catalyzed polyoxypropylene polyols which exhibit processing latitude similar to base-catalyzed copolymer analogs and homopolyoxypropylene analogs may be prepared by oxyalkylation with a mixture of propylene oxide and ethylene oxide such that a finite ethylene oxide content is maintained in the oxyalkylation reactor for the most substantial part of the oxyalkylation, the polyoxypropylene polyol having randomly distributed oxyethylene moieties which constitute 1.5 weight percent or more of the polyol product. Block copolymer polyols having external blocks containing lesser oxyethylene content than internal blocks and bicompositional compositions containing discrete multimodal and dissimilar and optionally multimodal polyols produced by a continuous addition of starter process are useful as polyols exhibiting greater processing latitude.

38 Claims, 1 Drawing Sheet

MOLDED AND SLAB POLYURETHANE FOAM PREPARED FROM DOUBLE METAL CYANIDE COMPLEX-CATALYZED POLYOXYALKYLENE POLYOLS AND POLYOLS SUITABLE FOR THE PREPARATION THEREOF

TECHNOLOGICAL FIELD

The present invention pertains to polyurethane molded and slab foam prepared from double metal cyanide complex-catalyzed polyether polyols exhibiting increased processing latitude. The present invention further pertains to multiblock and bicompositional polyoxyalkylene alkylene polyols prepared by the double metal cyanide complex (DMC) catalyzed polymerization of alkylene oxide mixtures to form polyoxypropylene polyether polyols having processing latitude suitable for use in preparing polyurethane molded and slab foam.

DESCRIPTION OF RELATED ART

Polyurethane polymers are prepared by reacting a di- or polyisocyanate with a polyfunctional, isocyanate-reactive compound, in particular, hydroxyl-functional polyether polyols. Numerous art-recognized classes of polyurethane polymers exist, for example cast elastomers, polyurethane RIM, microcellular elastomers, and polyurethane molded and slab foam. Each of these varieties of polyurethanes present unique problems in formulation and processing.

Two of the highest volume categories of polyurethane polymers are polyurethane molded and slab foam. In molded foam, the reactive ingredients are supplied to a closed mold and foamed, while in slab foam, the reactive ingredients are supplied onto a moving conveyor, or optionally into a discontinuous open mold, and allowed to rise freely. The resulting foam slab, often 6 to 8 feet (2 to 2.6 m) wide and high, may be sliced into thinner sections for use as seat cushions, carpet underlay, and other applications. Molded foam may be used for contoured foam parts, for example, cushions for automotive seating.

In the past, the polyoxypropylene polyether polyols useful for slab and molded foam applications have been prepared by the base-catalyzed oxypropylation of suitably hydric initiators such as propylene glycol, glycerine, sorbitol, etc., producing the respective polyoxypropylene diols, triols, and hexols. As is now well documented, a rearrangement of propylene oxide to allyl alcohol occurs during base-catalyzed oxypropylation. The monofunctional, unsaturated allyl alcohol bears an oxyalkylatable hydroxyl group, and its continued generation and oxypropylation produces increasingly large amount of unsaturated polyoxypropylene monols having a broad molecular weight distribution. As a result, the actual functionality of the polyether polyols produced is lowered significantly from the "nominal" or "theoretical" functionality. Moreover, the monol generation places a relatively low practical limit on the molecular weight obtainable. For example, a base catalyzed 4000 Da (Dalton) molecular weight (2000 Da equivalent weight) diol may have a measured unsaturation of 0.05 meq/g, and will thus contain 30 mol percent unsaturated polyoxypropylene monol species. The resulting actual functionality will be only 1.7 rather than the "nominal" functionality of 2 expected for a polyoxypropylene diol. As this problem is heightened as molecular weight increases, preparation of polyoxypropylene polyols having equivalent weights higher than about 2200–2300 Da is impractical using conventional base catalysis.

Many attempts have been made over the years to reduce the monol content of polyoxypropylene polyols. Use of lower temperatures and pressures results in some improvement, as illustrated by European published application EP 0 677 543 A1. However, monol content is only lowered to the range of 10–15 mol percent, and the reaction rate is decreased to such a degree that cost rises sharply due to increased reaction time. Use of alternative catalysts such as calcium naphthenate, optionally in conjunction with tertiary amine co-catalysts, result in polyols having levels of unsaturation of c.a. 0.02 to 0.04 meq/g, corresponding, again to 10–20 mol percent unsaturated monols.

Double metal cyanide catalysts such as zinc hexacyanocobaltate complexes were found to be catalysts for oxypropylation in the decade of the '60's. However, their high cost, coupled with modest activity and the difficulty of removing significant quantities of catalyst residues from the polyether product, prevented commercialization. Unsaturation of polyoxypropylene polyols produced by these catalysts was found to be low, however, at c.a. 0.018 meq/g. Improvements in catalytic activity and catalyst removal methods led to brief commercialization of DMC-catalyzed polyols in the 1980's. However, the economics were marginal at best, and the improvements expected due to the lower monol content and unsaturation did not materialize.

Recently, as indicated by U.S. Pat. Nos. 5,470,813, 5,482,908 and 5,545,610, researchers at the ARCO Chemical Company have produced DMC catalysts with exceptional activity, which have also resulted in lowering the unsaturation to unprecedented levels in the range of 0.002 to 0.007 meq/g. The polyoxypropylene polyols thus prepared were found to react in a quantitatively different manner from prior "low" unsaturation polyols in certain applications, notably cast elastomers and microcellular foams.

Despite their perceived advantages, substitution of such polyols for their base-catalyzed analogs in commercial scale molded and slab foam formulations has often led to catastrophic failure. In molded foams, for example, foam tightness increased to such an extent that the necessary crushing of the foams following molding proved difficult if not impossible. In both molded foams and slab foams, foam collapse often occurred, rendering such foams incapable of production. These effects occur even when the high actual functionality of such polyols is purposefully lowered by addition of lower functionality polyols to achieve an actual functionality similar to that of base-catalyzed polyols.

DMC-catalyzed polyoxypropylene polyols have exceptionally narrow molecular weight distribution, as can be seen from viewing gel permeation chromatograms of polyol samples. The molecular weight distribution is often far more narrow than analogous base-catalyzed polyols, particularly in the higher equivalent weight range, for example. Polydispersities less than 1.5 are generally obtained, and polydispersities in the range of 1.05 to 1.15 are common. In view of the low levels of unsaturation and low polydispersity, it was surprising that DMC-catalyzed polyols did not prove to be "drop-in" replacements for base-catalyzed polyols in polyurethane foam applications. Because oxypropylation with modern DMC catalysts is highly efficient, it is very desirable to provide DMC-catalyzed polyoxypropylene polyols which can directly replace conventional polyols in slab and molded polyurethane foam applications.

Figure 1:
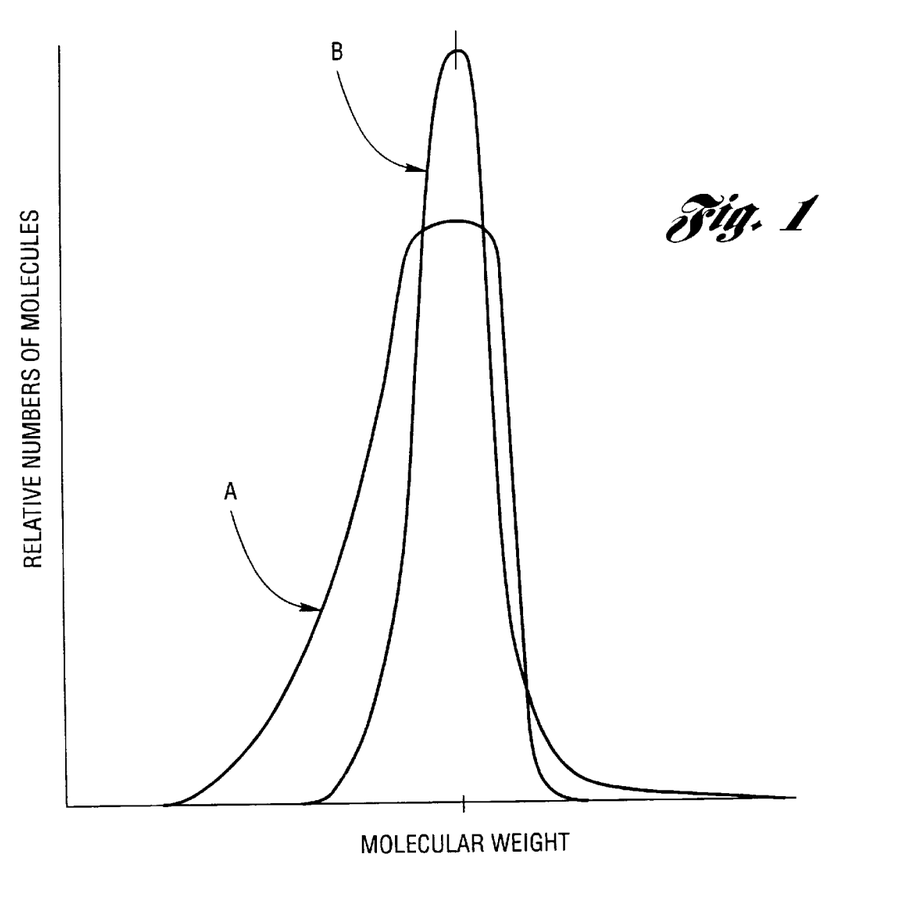
FIG. 1 illustrates hypothetical molecular weight distribution curves for a conventional, base-catalyzed polyol (Curve A) and a DMC-catalyzed polyol (Curve B).

A comparison of gel permeation chromatograms of base-catalyzed and DMC-catalyzed polyols discloses differences which have not heretofore been recognized as result-dependent in polyol performance. For example, as shown in Curve A of FIG. 1, a base-catalyzed polyol exhibits a significant "lead" portion of low molecular weight oligomers and polyoxypropylene monols prior to the main molecular weight peak. Past the peak, the weight percentage of higher molecular weight species falls off rapidly. In Curve B of FIG. 1, a similar chromatogram of a DMC-catalyzed polyol reveals a tightly centered peak with very little low molecular weight "lead" portion, but with a small portion of higher molecular weight species, which may be termed "high molecular weight tail". Due to the low concentration of the high molecular weight tail portion, generally less than 2–3 weight percent of the total, the polydispersity remains low. Both curves are idealized for purposes of illustration.

SUMMARY OF THE INVENTION

It has now been surprisingly discovered that multiblock or bicompositional DMC-catalyzed polyoxypropylene polyols which mimic the behavior of base-catalyzed analogs may be obtained, if during polyoxyalkylation, small but effective amounts of ethylene oxide or other suitable stabilization-modifying comonomers, as defined herein, are copolymerized along with propylene oxide during the most substantial part of oxypropylation, resulting in a random polyoxypropylene copolymer polyol. In both conventional batch processes and continuous addition of starter polyoxyalkylation processes, it is preferable that the amount of ethylene oxide in the external block not be disproportionately larger than the amount contained in the internal block. Bicompositional polyethers, as defined herein, are produced by the continuous addition of starter process. Both multiblock and bicompositional polyols have been found suitable for use in molded and slab foam applications, and display processing latitude similar to their base-catalyzed analogs.

DETAILED DESCRIPTION OF THE INVENTION

Intensive research into the chemical and physical characteristics of polyoxypropylene polyols has led to the discovery that despite the narrow molecular weight distribution and low polydispersities of DMC-catalyzed polyols, small high molecular weight fractions are responsible in large part for excessive foam tightness (stabilization) and foam collapse. It is surmised that these high molecular weight species exert a surfactant-like effect which alters the solubility and hence the phase-out of the growing polyurethane polymers during the isocyanate-polyol reaction.

While foam collapse in slab foam formulations (destabilization) employing DMC-catalyzed polyoxypropylene polyols has been associated with high molecular weight components, no explanation for the tightness (excessive stabilization) experienced in molded foam has heretofore been expressed. The inventors have surprisingly found that the high molecular tail component present in DMC-catalyzed polyoxypropylene polyols is responsible for excessive tightness in molded foam as well as foam collapse in slab foam. That the same cause creates the opposing effects of destabilization in slab foams and excessive stabilization in molded foams is most surprising.

Thus far, no completely effective methods of avoiding production of high molecular weight components during polyoxypropylation employing DMC catalysts have been found. The present inventors have surmised that the dissimilar processability of conventional polyols and DMC-catalyzed polyols may reside in the differences exhibited by these polyols with respect to their content of lower and higher molecular weight species. Since the complex phase-out of hard and soft segments which occurs during polyurethane polymerization is known to be affected by polyol molecular weight, this phase-out was one aspect which was identified as a possible cause of processability differences. It has been surprisingly discovered that preparation of polyoxypropylene polyols from mixtures containing a minimum effective amount of copolymerizable monomers, preferably ethylene oxide, throughout the substantial majority of DMC-catalyzed oxyalkylation, produces polyols which are useful in the same manner as their base-catalyzed polyoxypropylene counterparts in molded and slab foam applications while maintaining molecular weight distribution substantially the same as DMC-catalyzed, homopolymeric polyoxypropylene polyols.

It is most surprising that foam collapse in DMC-catalyzed polyol-based slab foam formulations (destabilization) is experienced, while at the same time, tightness (excessive stabilization) is experienced in molded foam. The inventors have surprisingly found that the incorporation of the previously discussed random internal ethylene oxide in DMC-catalyzed polyoxypropylene polyols cures both excessive tightness in molded foam as well as foam collapse in slab foam. That these very different processing difficulties can be cured by the same solution is most surprising.

Even though excessive foam tightness and foam collapse may be avoided by the preparation of DMC-catalyzed polyoxypropylene polyols as defined herein, the amount of high molecular weight tail is not believed to be significantly altered, and thus the unexpected and meritorious effects exhibited by copolymerized products must be due to some other cause. It is believed that the high molecular weight species generated are also copolymers, and that the presence of the more hydrophilic oxyethylene moieties, or of stereochemically different moieties such as butylene oxides, etc., in these fractions alters the compatibility of these species with the hard and soft segments of the growing polymer chains during polyurethane polymerization. The mechanism for this change is not known. It may result, for example, from a change in the hydrophile/lipophile balance (HLB) of the high molecular weight fractions, may create the polyether equivalent of polyurethane hard and soft segments, or may alter the crystallinity or stereoregularity, which in any case, may be defined as a change in "surfactancy" of the high molecular weight tail, since the effects are believed to be surface-related.

It has been found that the minimum amount of ethylene oxide copolymerized must be about 1.5 weight percent relative to the total feed of propylene oxide plus ethylene oxide. Amounts of 1 weight percent or less exhibited substantially the same properties as DMC-catalyzed homopolyoxypropylene polyols. Monomers other than ethylene oxide which may be used to achieve the meritorious effects of the subject invention include those monomers copolymerizable with propylene oxide or copolymerizable with mixtures of propylene oxide and ethylene oxide under DMC catalysis. Such monomers include, but are not limited to, 1,2-butylene oxide, 2,3-butylene oxide, oxetane, 3-methyloxetane, caprolactone, maleic anhydride, phthalic anhydride, halogenated propylene and butylene oxides, and α-olefin oxides. The effective amounts of such monomers in preparation of polyols which are suitable for use in slab foam may be readily ascertained by synthesis of a target polyol and evaluation of its performance in the super critical foam test, as hereinafter described. In general, the amounts employed will be similar to the amounts of ethylene oxide employed, on a mole-to-mole basis. However, copolymermizable monomers which cause greater disruption of the polyol structure of the high molecular weight fractions can be used in lesser amounts. Mixtures of such monomers are also useful, particularly in conjunction with ethylene oxide. These monomers, effective to modify the effect of high molecular weight tail, are referred to herein as stabilization-modifying comonomers. While ethylene oxide is used in the discussions which follow, these discussions apply as well to stabilization-modifying comonomers, unless indicated otherwise.

The maximum amount of ethylene oxide which can be successfully utilized depends upon the end use contemplated. As the amount of ethylene oxide increases, the polyol becomes increasingly hydrophilic, and when ethylene oxide is used in large amounts, the primary hydroxyl content rises. This increase in primary hydroxyl content is less important when ethylene oxide (EO) capped polyols are to be subsequently prepared, or when a high EP/PO ratio is to be used in the final stage of polymerization, for example to purposefully increase primary hydroxyl content for use in high resilience slab foam and in prepolymer or one-shot molded foam. In such cases, total oxyethylene content should be between 7% and 35% by weight, preferably between 7% and 30%, and more preferably between 7% and 25%. However, when low primary hydroxyl content, polyoxypropylene homopolymer mimics are contemplated, the total oxyethylene content should, in most cases be less than 20 weight percent, more preferably less than 15 weight percent, yet more preferably less than 10 weight percent, and most preferably in the range of about 2 weight percent to about 9 weight percent.

The polyols of the subject invention may be termed "multiblock" and "bicompositional" "spread EO polyols", as oxyethylene moieties are "spread", or randomly distributed throughout the portion of the polyol prepared by DMC-catalyzed oxyalkylation, but in different proportions, as hereinafter discussed.

It has been surprisingly discovered that the effects of both excessive stabilization as well as foam collapse may be altered by changing the proportions of ethylene oxide or stabilization-modifying monomer contained in the interior and exterior blocks of the subject polyol. Alteration of the block composition in multiblock polyols to affect foam stabilization is not believed to have heretofore been reported for any polyol prepared by any method of catalysis.

The polyols of the subject invention further include capped multiblock and bicompositional spread EO polyols which have been capped with an alkylene oxide or mixture of alkylene oxides in the presence of a non-DMC catalyst. The spread EO polyols and capped spread EO polyols include polyols prepared by oxyalkylating, in the presence of a DMC catalyst, a polyoxypropylene oligomer which is itself prepared by oxyalkylation employing a non-DMC catalyst, e.g. a basic catalyst such as potassium hydroxide.

It is important that the most substantial part of the polyoxyalkylation taking place in the presence of DMC catalysts be conducted in the presence of ethylene oxide or other stabilization-modifying comonomer. While the ethylene oxide feed to the polyoxyalkylation reactor may be occasionally interrupted, ethylene oxide will still be present in minor but decreasing amounts during such interruption. By the term "most substantial parts" in this regard is meant that ethylene oxide will be absent, i.e. will have a concentration in the polyoxyalkylation reactor of 0 weight percent, during not more than 5% of the total oxyalkylation period when propylene oxide is fed to the reactor during DMC catalysis, preferably not more than 3% of this period, and in particular not more than 1%. Thus, at least 95% of the polyoxyalkylene portion of the resulting polyol will contain randomly distributed oxyethylene or other stabilization-modifying moieties, with the minimum total oxyethylene or other monomer content being about 1.5 weight percent, including any homopolyoxypropylene "cap".

The values discussed above reflect only the portion of oxyalkylation performed in the presence of DMC catalysts, but preferably also include the activation period (induction period) where the DMC catalyst is being activated. Generally, DMC catalysts exhibit an initial induction period where the rate of oxyalkylation is small or zero. This is most evident in batch-type processes, where following addition of catalyst to the initiator(s), alkylene oxide is added to pressurize the reactor and the pressure monitored. The induction period is considered over when the alkylene oxide pressure drops. This pressure drop is often rather rapid, and the activated catalyst then exhibits a high oxyalkylation rate. The concentration of ethylene oxide during the induction period is desirably in the range of 1.5 to 15 weight percent. When propylene oxide is used to activate the catalyst in the absence of ethylene oxide, the length of time before a mixed alkylene oxide feed containing ethylene oxide is introduced into the activated catalyst-containing reactor is minimized to reduce propylene oxide homopolymerization. Thus, while a mixed feed induction period is desired, the induction period need not be taken into account when determining the portion of DMC-catalyzed oxyalkylation during which the presence of ethylene oxide or other stabilization-modifying comonomer is required.

It is sometimes necessary to produce capped polyoxyalkylene polyols. With base-catalyzed polyols, capping is generally performed by ceasing the feed of propylene oxide or propylene oxide/ethylene oxide mixtures and continuing with ethylene oxide only. This procedure produces polyols with a polyoxyethylene cap, resulting in a high primary hydroxyl content which increases polyol reactivity. For some base-catalyzed copolymer polyols, a "finish" with all propylene oxide may be used to produce polyols with high secondary hydroxyl content, i.e. a primary hydroxyl content less than about 3 mol percent. With DMC-catalyzed polyols, capping may be performed to produce polyols with both lower as well as higher primary hydroxyl content, but ethylene oxide capping may generally not be performed using DMC catalysts. While the latter catalysts may be used to prepare a polyoxypropylene cap, this cap must be less than 5 weight percent, and is preferably absent when the cap is prepared using DMC catalysts.

To cap a DMC-catalyzed polyol with either propylene oxide or ethylene oxide employing a non-DMC catalyst, the DMC catalyst must first be removed, destroyed, or inactivated. This is most conveniently done by adding ammonia, an organic amine, or preferably an alkali metal hydroxide. When the latter, e.g. KOH, is added in excess, the catalytic activity of the DMC catalyst is destroyed, and the excess KOH serves as a conventional base catalyst for capping. A "capped polyol" as that term is used herein is inclusive of DMC-catalyzed polyols which are further oxyalkylated in the presence of a non-DMC catalyst. This term does not include DMC-catalyzed PO/EO random copolymers which are subsequently reacted with all propylene oxide in the presence of a DMC catalyst; such polyols must meet the limitation disclosed earlier that the total oxyalkylation include no more than 5% of solely polyoxypropylation, most preferably not more than 1%. Otherwise, the resulting products will not process well.

As noted previously, it has further been found that the properties of spread EO polyols and capped spread EO polyols may be altered by changing the relative amounts of ethylene oxide added during various portions of the oxyalkylation. For example, in the preparation of slab polyols, it has been surprisingly discovered that at the same total oxyethylene content, polyols prepared by incorporating larger amounts of ethylene oxide during the initial stages of polyoxyalkylation and relatively lesser amounts during the final stage produces polyols which exhibit less tendency toward collapse in slab foam systems than those prepared with correspondingly lesser amounts of ethylene oxide during initial oxyalkylation.

Thus, the polyols of the subject invention are substantially polyoxypropylene, multiblock or bicompositional polyols containing minimally about 1.5 weight percent oxyethylene or other stabilization-modifying comonomer-derived moieties, these polyols produced in such a fashion that not more than 5%, and preferably not more than 3% of the total oxypropylation is conducted with propylene oxide alone. In conventional batch processes, to obtain the benefits of the subject invention, it is necessary that minimally di-block random polyoxypropylene polyols are produced. For slab foam, it is generally desired that the external portion of the polyol contain a lesser amount of oxyethylene moieties on a weight basis than an internal portion. For example, in the batch process, a 1500 Da molecular weight polyoxypropylene/polyoxyethylene triol containing 12 weight percent oxyethylene moieties may be further oxyalkylated in the presence of a mixture containing a lesser amount of ethylene oxide on a weight basis to prepare a polyol product having an oxyethylene content of less than 12% by weight. Such products unexpectedly provide superior performance in slab foam systems as compared to polyols of similar oxyethylene content where the external random block contains the same amount or more oxyethylene moieties than the internal block. However, in polyols for molded foam, enhanced processing is often observed by polyols where the polyol tip contains a higher oxyethylene content than the polyol interior.

In continuous addition of starter processes, both batch and continuous, it has been found that polyols with excellent properties may be obtained when the ratio of oligomeric starter oxyethylene moieties to total oxyethylene moieties, in weight percent, is greater than 0.30. In other words, the amount of ethylene oxide in the propylene oxide/ethylene oxide feed should not be disproportionately greater than the weight percent of oxyethylene moieties in the starter. It is preferable that the ratio of starter EO to external block EO be greater than 0.6, and more preferably 0.9 or more.

In the continuous addition of starter process, oligomeric initiators may be base-catalyzed homopolyoxypropylene initiators, base-catalyzed polyoxypropylene/polyoxyethylene block or random initiators of substantially any polyoxyethylene content, but preferably less than 20 weight percent, or may be DMC-catalyzed polyoxypropylene/polyoxyethylene random copolymer polyols provided the latter contain minimally 1.5 weight percent oxyethylene moieties, and preferably from 2 to about 20 weight percent, more preferably 2 to about 15, and most preferably 2 to about 10 weight percent oxyethylene moieties.

Synthesis of the multiblock and bicompositional spread EO polyols and capped spread EO polyols may be accomplished using the catalysts and by the methods generally set forth in U.S. Pat. Nos. 5,470,812, 5,482,908, 5,545,601 and 5,689,012 and copending application Ser. No. 08/597,781, herein incorporated by reference. In general, any DMC catalyst may be used for the oxyalkylation catalyst, including those disclosed in the foregoing U.S. patents and patent applications and in addition U.S. Pat. Nos. 5,100,997, 5,158,922, and 4,472,560. Activation of the DMC catalysts is performed by addition of propylene oxide, preferably in conjunction with minor amounts of ethylene oxide.

In conventional batch processing, DMC catalyst is introduced into the reactor together with the desired quantity of initiator, which is generally an oligomer having an equivalent weight in the range of 200 to 700 Da. Significant quantities of monomeric starters such as propylene glycol and glycerine tend to delay catalyst activation and may prevent activation altogether, or deactivate the catalyst as the reaction proceeds. The oligomeric starter may be prepared by base catalyzed oxypropylation, or by DMC catalysis. In the latter case, all but the induction period should be conducted in the presence of about 1.5 weight percent or more of ethylene oxide.

The reactor is heated, for example to 110° C., and propylene oxide, or a mixture of propylene oxide containing a minor amount of ethylene oxide is added to pressurize the reactor, generally to about 10 psig. A rapid decrease in pressure indicates that the induction period is over, and the catalyst is active. A mixed feed of propylene oxide and ethylene oxide is then added until the desired molecular weight is obtained. The PO/EO ratio will be changed during the reaction when diblock polyols are prepared.

In the conventional continuous process, a previously activated starter/catalyst mixture is continuously fed into a continuous reactor such as a continuously stirred tank reactor (CSTR) or tubular reactor. The same catalyst/initiator constraints as described in the batch process apply. A cofeed of propylene oxide and ethylene oxide is introduced into the reactor, and product continuously removed. A subsequent cofeed, e.g. at a further point along a continuous tubular reactor, contains a concentration of ethylene oxide different from the initial feed.

In the continuous addition of starter process, either batch operation or continuous operation may be practiced. In the batch process, catalyst and DMC catalyst are activated as in the conventional batch process. However, a smaller molar amount of initiator relative to the desired molar amount of product is used. The molar deficiency of starter is supplied gradually, preferably in the PO/EO feed, as low molecular weight starter such as propylene glycol, dipropylene glycol, glycerine, etc.

In the continuous, continuous addition of starter process, following catalyst activation, continuous addition of monomeric starter accompanies PO/EO feed. Product takeoff is also continuous, as is, in general, introduction of additional catalyst. Preferably, a takeoff stream from the reactor is used to activate the additional DMC catalyst. In this manner, following initial line out, products may be obtained which are entirely composed of random PO/EO, with EO spread throughout the molecule.

The starter molecules useful to prepare spread EO polyols are dependent upon the nature of the process. In batch processes, oligomeric starters are preferred. These include homopolymeric and copolymeric PO/EO polyols prepared by base catalysis, preferably having equivalent weights in the range of 200 Da to 700 Da, or DMC-catalyzed PO/EO copolymer polyols which have been prepared using cofed propylene oxide and ethylene oxide for the most substantial part of oxyalkylation other than the induction period, and contain minimally 1.5 weight percent oxyethylene moieties.

In the continuous addition of starter processes, both batch and continuous, the starter may be the same as those previously described; may be a lower molecular weight oligomer; a monomeric initiator molecule such as, in a non-limiting sense propylene glycol, dipropylene glycol, glycerine, sorbitol, or mixtures of such monomeric initiators; or may comprise a mixture of monomeric and oligomeric initiators, optionally in conjunction with a recycle stream from the process itself, this recycle stream containing polyols of target weight, or preferably polyols which are oligomeric relative to the polymer target weight.

The polyols of the subject invention have functionalities, molecular weights and hydroxyl numbers suitable for use in molded and slab foams. Nominal functionalities range generally from 2 to 8. In general, the average functionality of polyol blends ranges from about 2.5 to 4.0. The polyol equivalent weights generally range from about 800 Da to about 5000 Da when the unsaturation of the polyol is below 0.02 meq/g. Unsaturation is preferably 0.015 meq/g or lower, and more preferably in the range of 0.002 to about 0.008 meq/g. Hydroxyl numbers may range from 10 to about 60, with hydroxyl numbers in the range of 24 to 56 being more preferred. In prepolymer-derived molded foam, lower hydroxyl numbers are generally preferred, i.e. in the range of about 20 to about 35, advantageously about 24 to about 28. A terminal block containing in excess of 30 weight percent ethylene oxide, more preferably about 50 weight percent ethylene oxide or more is particularly useful. Blends may, of course, contain polyols of both lower and higher functionality, equivalent weight, and hydroxyl number. Any blend should preferably not contain more than 20 weight percent of non-spread EO, DMC-catalyzed polyols, for example DMC-catalyzed homopolymeric polyoxypropylene polyols or DMC-catalyzed polyoxypropylene/polyoxyethylene copolymer polyols having more than a 5 weight percent all-oxypropylene block.

The performance of multiblock and bicompositional spread EO polyols and capped spread EO polyols destined for use in slab foam may be assessed by testing these polyols in the "Supercritical Foam Test" (SCFT). Polyols which pass this test have been found to perform well in commercial applications, without foam collapse. The SCFT consists of preparing a polyurethane foam using a formulation which is expressly designed to magnify differences in polyol behavior. For molded foam polyols, vent collapse and crushability are factors which may be used to assess polyol performance either alone or in conjunction with SCFT.

In the SCFT, a foam prepared from a given polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyol, 100 parts; water, 6.5 parts; methylene chloride, 15 parts; Niax® A-1 amine-type catalyst, 0.10 parts; T-9 tin catalyst 0.34 parts; L-550 silicone surfactant, 0.5 parts. The foam is reacted with a mixture of 80/20 2,4- and 2,6- toluene diisocyanate at an index of 110. The foam may be conveniently poured into a standard 1 cubic foot cake box, or a standard 1 gallon ice cream container. In this formulation, conventionally prepared, i.e. base catalyzed polyols having high secondary hydroxyl cause the foam to settle approximately 15%±3%, whereas polyols prepared from DMC catalysts exhibiting substantially homopolyoxypropylene high molecular weight tail cause the foam to collapse by approximately 35–70%.

Having generally described this invention, a further understanding can be obtained by reference to certain specific examples which are provided herein for purposes of illustration only and are not intended to be limiting unless otherwise specified.

EXAMPLES 1–AND COMPARATIVE EXAMPLES C1–C3

These examples illustrate the significant and surprising differences between base-catalyzed, DMC-catalyzed homopolyoxypropylene polyols, and spread EO polyols. The base-catalyzed polyol is ARCOL® 5603, a 56 hydroxyl number glycerine-initiated homopolymeric polyoxypropylene polyol whose preparation was conventionally base-catalyzed using KOH. The relatively low equivalent weight resulted in a monol content of c.a. 8.2 mol percent, and an actual functionality of 2.83. The DMC-catalyzed polyols were prepared from initiators containing glycerine and propylene glycol in order to obtain actual functionalities close to the actual functionality of the base-catalyzed control, so as to render the comparisons of polyol processing as accurate as possible. Both batch and continuous addition of starter processes were employed in making the DMC-catalyzed polyols, the latter process indicated in Table 1 as "continuous", and producing a bicompositional polyol. The polyols were evaluated for processing latitude in the SCFT previously described, and compared to the control in terms of percent settle. KOH-catalyzed foams routinely exhibit a degree of settle of 15%±3%. The data is summarized in Table 1. Examples 1, 3, and 4 do not fall within the scope of the claimed invention, but are present to illustrate the problems associated with DMC-catalyzed slab and molding polyols.

TABLE 1

| Example:[1] | C1 | C2 | C3 | C4 | C5 |
|---|---|---|---|---|---|
| Polyol Type | KOH Catalyzed | DMC Batch | DMC Continuous | DMC Batch | DMC Batch |
| % Spread EO | 0 | 0 | 0 | 0.5 | 1.0 |
| Hydroxyl No. | 57.5 | 56.6 | 56.5 | 56[3] | 56[3] |
| Unsaturation (meq/g) | 0.029 | 0.005 | 0.005 | 0.005 | 0.005 |
| Functionality | 2.83 | 2.78 | 2.87 | NA | NA |
| SCFT (% Settle) | 15 ± 3% | 32% | 36% | 43% | 40% |

| Example:[1] | 1 | 2 | 3 | 4 | 5 |
|---|---|---|---|---|---|
| Polyol Type | DMC Batch | DMC Continuous | DMC Batch | DMC Batch | DMC |

TABLE 1-continued

|  |  |  |  |  | Continuous |
|---|---|---|---|---|---|
| % Spread EO | 1.75 | 2.4 | 5.0 | 6.0 | 6.4 |
| Hydroxyl No. | 56.5 | 56.3 | 56[3] | 56[3] | 56[3] |
| Unsaturation (meq/g) | 0.005 | 0.005 | 0.005 | 0.005 | 0.005 |
| Functionality | 2.76 | 2.88 | NA | NA | NA |
| SCFT (% Settle) | 19% | 12% | 20% | 14 | 15 |

[1]Examples with a preceding "C", e.g. "C1" are Comparative Examples.
[2]NA = not available.
[3]Nominal OH #.

The foregoing Examples and Comparative Examples illustrate both the importance of preparing polyoxyalkylene polyols containing spread EO as well as the criticality of the minimum amount required to produce a polyol suitable for foam production without collapse. In Comparative Example C1, the KOH-catalyzed polyol performed well in the SCFT, with a settle of 13%. DMC-catalyzed polyols exhibiting 15–20% settle have been found to run flawlessly in commercial production. Foams exhibiting settle greater than 35% almost always experience collapse. Foams with SCFT settle greater than 25% are not suitable for low density foam, but may be suitable for some higher density applications.

Comparative Examples C2 and C3 are batch and continuous DMC-catalyzed polyols prepared analogously to the Comparative Example C1 polyol, i.e. from all propylene oxide. These foams exhibited considerable settle, 32% and 36%, some times higher than the control KOH-catalyzed polyol. In Comparative Examples C4 and C5, both DMC-catalyzed batch polyols, very small amounts of ethylene oxide, 0.5% and 1.0% by weight, were cofed with propylene oxide, generating random copolymers. However, foams prepared from these polyols also exhibited severe settle, even more, at 43% and 40% respectively, than the all propylene oxide, DMC-catalyzed polyols of Comparative Examples C2 and C3.

In Example 1, however, a DMC-catalyzed batch polyol containing 1.75 weight percent uniformly copolymerized ethylene oxide yielded foams with a degree of settle virtually the same as the KOH-catalyzed control (19% v. 18%). Note that 18% is the actual value for the control KOH polyol run on the same day as the Example 1 derived foam. Similar excellent performance was achieved at 2.4 to 6.4 weight percent in the DMC-catalyzed polyols of Examples 2–5. Note that the bicompositional polyol of Example 2 performed better in the SCFT than either of the "monocompositional" spread EO polyols of Examples 1 and 3 which have less and more spread EO, respectfully.

EXAMPLES 6 AND COMPARATIVE EXAMPLES C6 AND C7

Bicompositional polyols were prepared employing the batchwise continuous addition of starter process. The 1.5 KDa polyoxyalkylated glycerine starter was added to the reactor with DMC catalyst, the catalyst activated, and oxyalkylation continued with a mixture of propylene oxide and ethylene oxide containing glycerine as the continuously added starter. The resulting polyol is bicompositional, having a first population of molecules (multiblock polyol) derived from the 1.5 KDa starter, thus having an internal block with EO content identical to starter EO content, and an external block with EO content identical to the EO feed composition. The second population of molecules (copolymer polyol) is a monoblock polyol derived from oxyalkylating the continuously added glycerine, and has an EO content throughout which is identical to the EO content of the EO/PO feed. Comparative Example C7 is a conventionally base-catalyzed polyol.

TABLE 2

|  | Example | | |
|---|---|---|---|
| Starter | 6<br>DMC-catalyzed,<br>12.8% EO | C6<br>DMC-catalyzed,<br>2.1% EO | C7<br>Glycerine |
| Multiblock Polyol | | | |
| Amount, wt. % | 30.1 | 30.1 | — |
| Internal EO | 12.0 | 2.0 | — |
| External EO | 7.8 | 10.4 | — |
| Copolymer Polyol | | | |
| Amount, wt. % | 59.9 | 59.9 | 100% |
| EO Content | 7.8 | 10.4 | — |
| Hydroxyl No. | 53.4 | 55.6 | 56 |
| Total EO | 8.5 | 8.5 | 8.5 |
| Ratio Starter EO:<br>Total EO | 1.4 | 0.24 | — |
| SCFT (% Settle) | 12.6 | 40.4 | 11 |

As can be seen from foregoing Example 6 and Comparative Examples C6–C7, in the continuous addition of starter process, where a bicompositional population of molecules is obtained, oxyalkylating a higher oxyethylene content initiator to achieve the same target oxyethylene content unexpectedly produces polyols having enhanced processing latitude, as evidenced by their low percent of settle relative to base-catalyzed counterparts. In Comparative Example C6, where the starter EO to total EO ratio is less than 0.3, foam collapse is observed. This ratio must be maintained higher than 0.3.

EXAMPLES 7–15 AND COMPARATIVE EXAMPLES C8 to C12

DMC-catalyzed polyols with various hydroxyl numbers were prepared using the continuous addition of starter process, employing polyoxyalkylated glycerine oligomeric initiators having various oxyethylene contents, the target total oxyethylene content being maintained constant by adjusting the ethylene oxide content of the oxyalkylating alkylene oxide mixture. The polyols thus prepared are compared to standard base-catalyzed slab polyols of the same oxyethylene content. Comparative Example base-catalyzed polyols C8 and C9 contain a 6.5 weight percent polyoxypropylene cap to lower the primary hydroxyl content. The results are presented in Table 3.

TABLE 3

| Example: | C8 | 7 | 8 | 9 | C9 | C10 | 10 | 11 | 12 | C11 | C12 | 13 | 14 | 15 |
|---|---|---|---|---|---|---|---|---|---|---|---|---|---|---|
| Polyol Type | KOH-catalyzed | DMC | DMC | DMC | KOH-catalyzed | DMC | DMC | DMC | DMC | KOH-catalyzed | DMC | DMC | DMC | DMC |
| Starter EO Content wt. % | N/A | 2 | 6 | 12 | N/A | 2 | 6 | 9 | 12 | N/A | 2 | 6 | 9 | 12 |
| Total EO | 8.5 | 6.4 | 6.4 | 6.4 | 12.5 | 9.4 | 9.4 | 9.4 | 9.4 | 12.0 | 10.5 | 10.5 | 10.5 | 10.5 |
| Ratio Starter EO: Total EO | — | 0.31 | 0.93 | 1.87 | — | 0.21 | 0.63 | 0.95 | 1.28 | — | 0.19 | 0.57 | 0.86 | 1.14 |
| Hydroxyl No. | 56 | 56 | 56 | 56 | 52 | 52 | 52 | 52 | 52 | 48 | 48 | 48 | 48 | 48 |
| SCFT (% Settle) | 15 ± 3% | 26 | 15 | 18 | 15 ± 3% | 35 | 11 | 9 | 13 | 15 ± 3% | 40 | 27 | 25 | 17 |

The results presented in Table 3 illustrate the beneficial results obtained when the ratio of starter oxyethylene content to total oxyethylene content is at least 0.30. In Example 7, with a ratio of 0.31, the foam settle is acceptable, but higher than desired. In Comparative Examples C10 and C12, where the ratio is less than 0.30, unacceptable settle (foam collapse) occurs.

In the following examples, polyurethane molded foams were prepared to assess the effects of EO content and location in polyoxypropylene polyols in molded foam. The foams were prepared by the method disclosed in U.S. Pat. No. 5,700,847. The isocyanate-terminated prepolymer is an NCO-terminated prepolymer prepared by reacting 58 parts of an 80/20 mixture of TDI/MDI with 75 parts of the base polyol under consideration, and 25 parts of a polymer polyol containing 43 weight percent acrylonitrile/styrene solids as the dispersed phase. To 158 parts prepolymer is added 1 part DC 5043 silicone foam control agent (surfactant), 0.25 parts NIAX® A1 amine catalyst, and 5 parts water. The foams were prepared by introducing the intensively mixed reactive components into a standard mold, closing the mold, and allowing the ingredients to react and foam. The vent collapse is noted, and the force required to crush the foam for each of three crush cycles noted.

EXAMPLES 16 and 17 AND COMPARATIVE EXAMPLES C13 and C14

The polyol of Example 16 and Comparative Example C13 are prepared by the continuous addition of starter process incorporating a small quantity of water as a cofeed with glycerine continuously added starter. As a result, the polyols have an actual functionality similar to their base catalyzed counterparts, i.e. in the neighborhood of 2.7. Both polyols are DMC-catalyzed, and have equivalent weights of c.a. 2000 Da. The Comparative Example C13 polyol contains no internal EO block, initial polymerization to prepare the "backbone" being conducted with PO only. The external "tip" or "cap" of the C13 polyol was prepared employing DMC catalysis with a 45/55 EO/PO ratio. The total EO content is 15 weight percent, of which 100% is located in the exterior block (tip). The Example 16 polyol was prepared by incorporating ethylene oxide during preparation of the backbone, followed by altering the EO/PO ratio to 45/55 such that the backbone contained 25% of total EO, with 75% total EO in the tip. The Example 17 polyol was prepared similarly to that of the Example 16 polyol, but with no continuously added water, and with a slightly lower EO content. Thus, the Example 16 polyol contains a 15 weight percent cap, similar to the 15 weight percent cap of the Comparative Example C13 polyol, but contains 5% internal EO. The Example 17 polyol contains the same total EO as the polyols of C13 and C14. Base polyol details and foam properties (vent collapse, force to crush) are summarized in Table 4.

TABLE 4

| | Example: | | | |
|---|---|---|---|---|
| | 16 | C13 | C14 | 17 |
| Base Polyol | | | | |
| Total EO, wt % | 20% | 15% | 15% | 15% |
| Backbone EO, % of Total | 25% | 0% | 0% | 25% |
| Tip EO, % of Total | 75% | 100% | 100% | 75% |
| EO/PO Ratio in Tip | 45/55 | 45/55 | 45/55 | 45/55 |
| Functionality | 2.7 | 2.7 | 3.0 | 3.0 |
| Equivalent Wt. | 2000 Da | 2000 Da | 2000 Da | 2000 Da |
| Foam Processing | | | | |
| Vent Collapse | 2.5 cm | 3.3 cm | — | — |
| Force to Crush | 403/180/133 | 525/282/192 | 552/254/201 | 248/121/95 |

The results presented in Table 4 indicate that incorporation of ethylene oxide during preparation of the polymer backbone of molding polyol, despite having no possible effect on reactivity, as the polyols are employed in prepolymer formulations in which the polyol is already fully reacted, nevertheless results in molded foam which require considerably lower force to crush, while maintaining foam vent stability.

EXAMPLES 18–21

In a manner similar to that of Examples 16 and 17, water-blown, prepolymer derived foams were prepared from a prepolymer consisting of the isocyanate-terminated reaction product of 75 parts base polyol, 25 parts polymer polyol, and 42 parts of an 80/20 mixture of TDI/MDI. The prepolymer was intensively mixed with 3.5 parts water containing 0.25 parts NIAX® A1 amine catalyst. The base polyol properties and foam properties are given in Table 5 below.

TABLE 5

| | Example: | | | |
|---|---|---|---|---|
| | 18 | 19 | 20 | 21 |
| Base Polyol | | | | |
| Total EO, wt % | 20% | 20% | 20% | 27% |
| Backbone EO, % of Total | 50% | 25% | 12.5% | 50% |
| Tip EO, % of | 50% | 75% | 87.5% | 50% |

TABLE 5-continued

| | Example: | | | |
|---|---|---|---|---|
| | 18 | 19 | 20 | 21 |
| Total EO/PO Ratio in Tip | 45/55 | 45/55 | 45/55 | 45/55 |
| Functionality | 3.0 | 3.0 | 3.0 | 3.0 |
| Equivalent Wt. | 2000 Da | 2000 Da | 2000 Da | 2000 Da |
| Foam Processing | | | | |
| Force to Crush | 69/65/65 | 252/114/97 | 297/141/117 | 439/179/130 |

The results in Table 5 illustrate how the ethylene oxide distribution can be used to alter foam processing. In Examples 18–20, altering the percentage of ethylene oxide in the backbone and tip results in considerable variation in the force to crush. All foams were good quality foams. The low force to crush value of Example 18 is particularly noteworthy.

EXAMPLE 22 and Comparative Examples C15 and C16

Three base polyols for use in one-shot molded foams were prepared. The backbone of the base polyol of Example 22 was prepared using a DMC catalyst and a cofeed of ethylene oxide and propylene oxide. A polyoxyethylene cap was then added using KOH catalysis, as present DMC catalysts are not effective in polymerizing all ethylene oxide in an acceptable manner. The Comparative Example C15 polyol was prepared in a similar manner, but contained no internal random EO in the DMC-catalyzed polymer backbone. The Comparative Example C16 polyol was a conventionally KOH-catalyzed polyol, both backbone and cap. Each base polyol, 75 parts, was mixed with 25 parts polymer polyol, 4.25 parts water (blowing agent), 1.5 parts diethanolamine, 0.1 part NIAX® A1 and 0.3 part NIAX® A-33 amine catalysts, and 1.0 part DC 5043 silicone surfactant, and reacted with TDI at 105 index in a closed mold. The base polyol composition and molded foam results are presented in Table 6.

TABLE 6

| | Example: | | |
|---|---|---|---|
| | 22 | C15 | C16 |
| Base Polyol | | | |
| Polyol Backbone Catalyst | DMC | DMC | KOH |
| Polyol Cap Catalyst | KOH | KOH | KOH |
| Total EO, wt % | 20% | 15% | 15% |
| Internal EO, % of Total | 25% | 0% | 0 |
| Cap EO, % of Total | 75% | 100% | 100% |
| EO/PO Ratio in Cap | 100/0 | 100/0 | 100/0 |
| Nominal Functionality | 3 | 3 | 3 |
| Equivalent Wt. | 2000 Da | 2200 Da | 2000 Da |
| Foam Processing | | | |
| 75% Force to Crush | 299/106/74 | 158/53/41 | 133/35/32 |
| Cell Appearance | Normal | Very Coarse | Normal |
| Vent Collapse, cm. | 27 | 38 | 52 |

The results presented in Table 6 illustrate the substantial differences between the subject invention polyols and comparative polyols. In one-shot systems, unlike prepolymer systems, polyol reactivity is important, and for this reason, polyols with high primary hydroxyl content are required. Past attempts to prepare DMC-catalyzed polyols have been tailored after their KOH-catalyzed analogs, i.e. the backbones were homopolyoxypropylene polyols which were then capped with EO in the presence of KOH to provide a polyoxyethylene capped, high primary hydroxyl content polyol. However, as illustrated in Table 6, such polyols are not suitable for molded foam. Although the reactivity is acceptable, the homopolyoxypropylene backbone-containing, DMC-catalyzed polyol (Comparative Example C15) fails to produce acceptable foam. Although the force to crush values appear desirably low, the cell size is very coarse, with cells about 1 cm in size having been formed. Thus, the force to crush values are those expected of a spongy-appearing product rather than the required uniform, fine-celled foam. Adding a portion of ethylene oxide during DMC-catalyzed backbone preparation produces a normal, fine-celled foam.

The polyols of the subject invention can be used to prepare polymer polyols which do not contribute to foam collapse or to excessive foam stabilization. Such polymer polyols are prepared by the in situ polymerization of one or more vinyl monomers in a base polyol which is a polyol of the subject invention. The in situ vinyl polymerization is a well known process, and may, for example, employ preformed stabilizers or stabilizer precursors. Preferred vinyl monomers are styrene, acrylonitrile, methylmethacrylate, vinylidine chloride, and the like. Solids contents as prepared preferably range from 30 weight percent to 50 weight percent or higher.

By the terms "improved processing latitude" and "processing latitude-increasing" and like terms is meant that the polyol in-question exhibits performance in the supercritical foam test superior to that exhibited by a DMC-catalyzed, homopolyoxypropylene analog, with a percent settle of less than 35%, preferably less than 25%, and most preferably has the same or lesser degree of settle as a comparative base-catalyzed polyol when destined for use in slab foam formulations.

By the terms "major" and "minor" if used herein, is meant 50% or more and less than 50%, respectively, unless indicated otherwise. The terms "initiator" and "starter" are used herein interchangeably and have the same meaning unless otherwise specified. By the terms "a" or "an" in the claims herein is meant one or more unless the language clearly indicates the contrary. By the term "unitary" as applied to the EO composition of bicompositional populations of molecules is meant that the multiblock polyether and the monoblock polyether both contain a block having an EO/PO ratio or stabilization-modifying comonomer/PO ratio which are identical by virtue of being polymerized in the same vessel with the same alkylene oxide feed. Molecular weights and equivalent weights herein are number average molecular and equivalent weights unless indicated otherwise. By the term "ethylene oxide target content" and like terms is meant the total percentage on a weight basis of the oxyethylene content of the polyol produced.

Any embodiment described or claimed herein can be used to the exclusion of any embodiment or feature not disclosed and/or claimed, provided that the features necessary to the invention are present. Necessary features of the invention include conducting oxypropylation in the presence of ethylene oxide for minimally 95% and preferably 97% of DMC-catalyzed oxyalkylation; a minimum oxyethylene content of 1.5 weight percent relative to the weight of the polyol exclusive of any cap added in the presence of a capping-effective catalyst with respect to polyoxyethylene caps and not more than 5 weight percent of a polyoxypropylene cap prepared in the presence of a DMC catalyst; and the presence of multiple block structure and/or a bicompositional population.

Having now fully described the invention, it will be apparent to one of ordinary skill in the art that many changes and modifications can be made thereto without departing from the spirit or scope of the invention as set forth herein.

What is claimed is:

1. In a process for the preparation of a polyurethane slab or molded foam by the reaction of a di- or polyisocyanate with a polyol component in the presence of blowing agent (s), catalyst(s), chain extender(s), crosslinker(s), surfactant (s), additives and auxiliaries, the improvement comprising:

selecting as at least a portion of said polyol component, a processing latitude-increasing DMC-catalyzed, spread EO polyoxypropylene polyol having a nominal functionality of 2 or more, and a random oxyethylene content of 1.5 weight percent or more, said spread EO polyol comprising one or more polyols selected from the group consisting of:

a) multiblock polyoxypropylene polyols having an internal block with an oxyethylene content of from about 1.5 weight percent to about 20 weight percent, and a second block external to said internal block, said second block having an oxyethylene content greater than 1.5 weight percent to about 20 weight percent; and b) bicompositional multiblock polyoxypropylene polyols characterized by a first mode of molecules having an internal block containing from 1.5 weight percent to about 20 weight percent oxyethylene moieties, said internal block derived from an oligomeric starter molecule, and at least one external block containing from 1.5 weight percent to about 20 weight percent oxyethylene moieties, the oxyethylene content of said at least one external block being different from the oxyethylene content of said internal block; and a second mode of molecules having no internal block derived from an oligomeric starter molecule, and containing from about 1.5 weight percent to about 20 weight percent oxyethylene moieties;

the ratio of starter oxyethylene content to total oxyethylene content of said bicompositional multiblock polyoxypropylene polyols being greater than 0.30, and wherein at least 95% of DMC-catalyzed oxypropylation is conducted in the presence of ethylene oxide.

2. The process of claim 1 wherein said spread EO polyoxypropylene polyol has a total oxyethylene content in the range of 2 weight percent to 35 weight percent.

3. The process of claim 1 wherein said spread EO polyoxypropylene polyol has less than 5 weight percent polyoxypropylene cap prepared by DMC catalysis.

4. The process of claim 1 wherein said spread EO polyoxypropylene polyol exhibits a settle of less than about 35% in the supercritical foam test.

5. The process of claim 1 wherein said spread EO polyoxypropylene polyol exhibits a settle of less than about 25% in the supercritical foam test.

6. A process for the preparation of a DMC-catalyzed polyoxypropylene polyol having increased processing latitude when used in polyurethane molded and slab foam systems, said process comprising:

a) supplying an activated DMC catalyst/initiator mixture in a reactor;

b) polyoxyalkylating said initiator with an alkylene oxide mixture containing propylene oxide and ethylene oxide such that the polyol contains about 1.5 weight percent or more of random oxyethylene moieties, and the concentration of ethylene oxide during DMC-catalyzed oxyalkylation is above zero for minimally 95% of the total oxyalkylation, to produce a polyoxypropylene/polyoxyethylene intermediate copolymer polyol having an oxyethylene content greater than the oxyethylene target content of the final product DMC-catalyzed polyoxypropylene polyol;

c) oxyalkylating the intermediate copolymer polyol of step b) with a mixture of propylene oxide and ethylene oxide having an ethylene oxide content less than the oxyethylene target content of the final product DMC-catalyzed polyoxypropylene polyol; and d) recovering a multiblock spread EO poly-oxypropylene polyol, said spread EO polyoxypropylene polyol having a target oxyethylene content greater than 1.5 weight percent.

7. The process of claim 6 wherein said spread EO polyoxypropylene polyol exhibits a settle of less than about 35% in the supercritical foam test.

8. The process of claim 6 wherein said spread EO multiblock polyoxypropylene polyol exhibits a settle of less than about 25% in the supercritical foam test.

9. The process of claim 6 wherein the concentration of ethylene oxide in the alkylene oxide feed is maintained at a level of 0.5 weight percent or greater during all steps of oxyalkylation.

10. The process of claim 6 wherein said spread EO polyol is polyoxypropylene capped, said polyoxypropylene cap constituting no more than 5 weight percent of said spread EO polyoxyalkylene polyol when said polyoxypropylene cap is prepared by capping with propylene oxide in the presence of a DMC catalyst.

11. The process of claim 10 wherein the weight percent of oxyethylene moieties is between 2 weight percent and 15 weight percent.

12. The process of claim 6 wherein said process is a continuous process wherein additional initiator molecules are continually or incrementally added to said reactor.

13. The process of claim 12 wherein said additional initiator molecules have an equivalent weight of 100 Da or less.

14. A process for the preparation of a DMC-catalyzed polyoxypropylene polyol composition having increased processing latitude when used in polyurethane molded and slab foam systems, said process comprising:

a) supplying an activated DMC catalyst/oligomeric initiator mixture in a reactor, said oligomeric initiator comprising an oligomer selected from the group consisting of a polyoxypropylene/polyoxyethylene random copolymer polyol prepared by oxyalkylating a suitable able starter molecule with a mixture of propylene oxide containing about 1.5 weight percent or more of ethylene oxide in the presence of a DMC catalyst, a polyoxypropylene homopolymer or poly-oxypropylene/polyoxyethylene copolymer polyol prepared by oxyalkylating a suitable starter molecule in the presence of a non-DMC catalyst, said initiator having an equivalent weight greater than 200 Da;

b) oxyalkylating said oligomeric initiator in the presence of a DMC catalyst with a mixture of propylene oxide and ethylene oxide containing 1.5 weight percent or more of ethylene oxide while continuously adding to said reactor further starter having an equivalent weight less than 200 Da; and c) recovering a bicompositional polyol composition containing a multiblock polyoxypropylene/ polyoxyethylene copolymer polyol c)i) containing an internal block corresponding to said oligomeric initiator and one or more external blocks prepared by oxyalkylation of said oligomeric initiator in step b) in the presence of said DMC catalyst; and at least one copolymer polyol not having an internal block corresponding to said oligomeric initiator c) ii); with the proviso that when said oligomeric initiator is a polyoxypropylene/polyoxyethylene oligomer prepared by DMC catalysis, at least one external block has an oxyethylene content which differs from that of the oxyethylene content of said oligomeric initiator and has a ratio of oligomeric initiator oxyethylene content to total oxyethylene content of minimally 0.30.

15. The bicompositional polyol composition of claim 14 which exhibits a percent settle of less than about 35% in the supercritical foam test.

16. The process of claim 14, wherein the percent settle in the supercritical foam test is less than 25%.

17. The process of claim 14, wherein said DMC-catalyzed polyol is a polyoxypropylene triol having a hydroxyl number in the range of about 10 to about 60, wherein said ratio of oligomeric initiator oxyethylene content to total oxyethylene content is greater than 0.4.

18. The process of claim 14 wherein ethylene oxide is used to cap said polyols in the presence of a capping-effective catalyst, the amount of polyoxyethylene cap formed being about 30 weight percent or less of the total weight of the composition.

19. The process of claim 14 wherein said polyols c)i) constitute from about 1 weight percent to 60 weight percent of said bicompositional composition.

20. The process of claim 14 wherein the weight percent of ethylene oxide in said propylene oxide/ethylene oxide mixture of step b) is greater than the weight percent of ethylene oxide in said oligomeric initiator.

21. A multiblock DMC-catalyzed polyoxypropylene polyol which exhibits broad processing latitude in polyurethane foam formulations, said polyol prepared by the oxyalkylation of an initiator molecule or mixture thereof having two or more oxyalkylatable hydrogen atoms, said oxyalkylation performed in an oxyalkylation reactor with a first mixture of propylene oxide and ethylene oxide in the presence of a DMC catalyst, said first mixture containing more than about 1.5 weight percent or more ethylene oxide, followed by oxyalkylation with a second mixture of propylene oxide and ethylene oxide, the concentration of ethylene oxide in said second mixture different than the concentration of ethylene oxide in said first mixture, said polyol having a total oxyethylene content of more than 1.5 weight percent and the concentration of ethylene oxide in said reactor being substantially zero for no more than 5 percent of the total oxyalkylation with both said first mixture and said second mixture.

22. The polyol of claim 21 which exhibits a percent settle of about 35% or less in the supercritical foam test.

23. The polyol of claim 21 which exhibits a percent settle of about 25% or less in the supercritical foam test.

24. The polyol of claim 21 wherein said polyol has an oxyethylene content of between about 2 weight percent and 9 weight percent.

25. The polyol of claim 21 wherein 5–40 weight percent total oxyethylene moieties are located in internal blocks, and 95–60 weight percent of total oxyethylene moieties are located in an external block, the total oxyethylene content of said multiblock polyol being from 7% to 35% by weight relative to total polyol weight, and wherein the EO/PO ratio of said external block is from 20/80 to 80/20.

26. The polyol of claim 21 wherein 8–35 weight percent total oxyethylene moieties are located in internal blocks, and 92–65 weight percent of total oxyethylene moieties are located in an external block, the total oxyethylene content of said multiblock polyol being from 7% to 30% by weight relative to total polyol weight, and wherein the EO/PO ratio of said external block is from 30/70 to 80/20.

27. The polyol of claim 21 wherein 12–25 weight percent total oxyethylene moieties are located in internal blocks, and 88–75 weight percent of total oxyethylene moieties are located in an external block, the total oxyethylene content of said multiblock polyol being from 7% to 25% by weight relative to total polyol weight, and wherein the EO/PO ratio of said external block is from 40/60 to 75/25.

28. The polyol of claim 25 further comprising a polyoxyethylene cap which comprises from 10 weight percent to about 30 weight percent of the total polyol weight.

29. A DMC-catalyzed polyol which exhibits broad processing latitude in polyurethane foam formulations, said polyol comprising a bicompositional composition comprising:
  a) a first multiblock polyoxypropylene/poly-oxyethylene copolymer having
    a)i) an internal block derived from a homopolymeric polyoxypropylene or polyoxypropylene/polyoxyethylene copolymeric oligomeric starter prepared by oxyalkylating a low molecular weight starter molecule with the aid of a non-DMC catalyst, or a polyoxypropylene/polyoxyethylene copolymeric starter containing minimally 1.5 weight percent oxyethylene moieties prepared by oxyalkylating a low molecular weight starter molecule with the aid of a DMC catalyst; and
    a)ii) at least one external block which is a random polyoxypropylene/polyoxyethylene block having a weight percent oxyethylene moieties different from the weight percent oxyethylene moieties of said internal block a)i); and
  b) at least one polyoxypropylene/polyoxyethylene random copolymer polyol having no internal block derived from said oligomeric starter, and having an oxyethylene content of greater than 1.5 weight percent, the oxyethylene content being the same as the oxyethylene content of said external block a)ii) of said multiblock polyol a);
the weight ratio of oxyethylene moieties in said oligomeric starter to the total oxyethylene content of said DMC-catalyzed polyol being at least 0.3.

30. The DMC-catalyzed polyol of claim 29 which exhibits percent settle of less than about 35% in the supercritical foam test.

31. The DMC-catalyzed polyol of claim 29 wherein the percent settle is less than 25% in the supercritical foam test.

32. The DMC-catalyzed polyol of claim 29 wherein said oligomeric starter comprises a polyoxypropylene/polyoxyethylene random copolymer polyol having a weight percent of oxyethylene moieties greater than 3 weight percent and an equivalent weight from about 200 Da to about 700 Da.

33. The DMC-catalyzed polyol of claim 29 wherein the weight ratio of oxyethylene moieties in said oligomeric starter to the total oxyethylene content of said DMC-catalyzed polyol is at least 0.4.

34. The DMC-catalyzed polyol of claim 29 wherein said multiblock polyol a) comprises from about 1 weight percent to about 60 weight percent of said bicompositional composition.

35. The DMC-catalyzed polyol of claim 29 comprising a polyoxyethylene cap constituting about 15 weight percent or less of said DMC-catalyzed polyol composition, said polyoxyethylene cap prepared with the aid of a capping-effective catalyst.

36. A multiblock DMC-catalyzed polyoxypropylene polyol which exhibits broad processing latitude in polyurethane foam formulations, said polyol prepared by the oxyalkylation of an initiator molecule or mixture thereof having two or more oxyalkylatable hydrogen atoms, said oxyalkylation performed in an oxyalkylation reactor with a first mixture of propylene oxide and either or both of ethylene oxide or a stabilization-modifying comonomer in the presence of a DMC catalyst, said first mixture containing a stabilizing effective amount of said ethylene oxide or said stabilization-modifying comonomer, followed by oxyalkylation with a second mixture of propylene oxide and either or both ethylene oxide and a stabilization-modifying comonomer, the concentration of ethylene oxide or stabilization-modifying comonomer in said second mixture different than the concentration of said first mixture, the concentration of ethylene oxide or said stabilization-modifying comonomer in said reactor being substantially zero for no more than 5 percent of the total oxyalkylation with both said first mixture and said second mixture.

37. The multiblock DMC-catalyzed polyol of claim 36 which exhibits a percent settle of less than 35% in the supercritical foam test.

38. A bicompositional DMC-catalyzed polyol which exhibits broad processing latitude in polyurethane foam formulations, said polyol comprising:

a) a first, multiblock polyol, said polyol having a first block comprising:
 i) a non-DMC-catalyzed oxypropylene-containing block; or
 ii) a DMC-catalyzed, oxypropylene-containing block further comprising copolymerized comonomers selected from the group consisting of ethylene oxide, stabilization-modifying comonomers, and mixtures thereof, with the proviso that when only oxyethylene moieties are present as comonomers, they are present in an amount greater than about 1.5 weight percent, and at least a second, external block comprising:
 iii) a DMC-catalyzed mixture of propylene oxide and an effective stabilizing amount of one or both of ethylene oxide and a stabilization-modifying comonomer; and b) a random polyoxypropylene copolymer polyol having no internal block derived from an oligomeric starter molecule with equivalent weight greater than 200 Da, and containing a monomer distribution which is the same as the monomer distribution of a)iii).

* * * * *